United States Patent Office 3,052,547
Patented Sept. 4, 1962

3,052,547
PROCESS OF PREVENTING PRECIPITATION IN MALT BEVERAGES AND PRODUCT
Gerhard J. Haas, 170 Pleasant St., Rumford, East Providence, R.I., and Alan I. Fleischman, 89—40 151st Ave., Queens, N.Y.
No Drawing. Filed Apr. 7, 1961, Ser. No. 101,343
10 Claims. (Cl. 99—48)

This invention relates to the manufacture of malt beverages, and more particularly, to a method of treating malt beverages for avoiding formation of unsightly precipitates in said beverages upon freezing and thawing thereof.

Malt beverages such as beer and ale are not intentionally frozen and thawed. Their freezing point is below that of water, and usually at approximately 28° F. Neither the manufacturing steps involved in brewing and packaging malt beverages, nor their transportation and storage require them to be cooled below their freezing temperature. Still, freezing of a malt beverage occurs not infrequently either under atmospheric conditions of low temperature, or when the beverage is stored in a refrigerated space the temperature of which is controlled below 28° F.

It is well established that malt beverages subjected to one or several cycles of freezing and thawing may develop a cloudiness or even a sediment which makes them unacceptable for consumption. Beer and other malt beverages are expected to be entirely transparent and free of solid matter. A precipitate whether suspended in the liquid or deposited at the bottom of a container is considered undesirable and unappetizing by the customer and evidence of spoilage. Substantial quantities of beer are returned to breweries by complaining purchasers because of the presence of solid material therein after freezing and thawing of the packaged beer has occurred. Such beer cannot economically be restored to marketable condition and is usually destroyed. The loss of the goods, and even more important, the loss of customers' good will is of substantial importance to the brewing industry.

The precipitate formed upon freezing and thawing of a malt beverage consists of insoluble flake-like particles the nature of which had not been exactly determined heretofore.

It is one object of the present invention to provide a simple and effective method of preventing formation of such precipitation and sedimentation on freezing and thawing.

Another object of the present invention is to provide a stable malt beverage which is non-precipitating on freezing and thawing.

Other objects of the present invention and advantageous features thereof will become apparent as the description proceeds.

The present invention is based on the finding that the insoluble flakes are essentially of a carbohydrate nature, and may contain minor amounts of co-precipitated oxalates if such oxalates are present in the packaged beer. Typically, the flakes consist of about 25% of calcium oxalate and of about 75% of a carbohydrate polymer or condensation product which, upon hydrolysis, yields glucose, N-acetyl glucosamine, and glucuronic acid in an approximate molar ratio of 5:3:2, and a small quantity of phosphate. This analysis of frozen beer precipitate is herewith reported for the first time.

The analytical tests carried out showed that no protein or lipoidal material was present. The calcium oxalate was determined both by chelometric titration with disodium ethylenediamine tetraacetate using acyanide-inhibited eriochrome-T-black indicating at pH 10, for calcium according to the method used by Owades, J. L., Rubin, G., and Brenner, M. W., Amer. Soc. Brew. Chem. Proc., 193 (1956), and by determining oxalate ion, first converting it to calcium oxide and then acidimetrically titrating the oxide to a methyl red endpoint according to the method used by Burger, M., and Becker, K., Amer Soc. Brew. Chem. Proc., 102 (1949). Although the calcium oxalate content in several samples varied, it was found, with anion-free beer, that the presence of calcium oxalate was neither a necessary nor a sufficient condition for the formation of frozen beer precipitate. Thus the calcium oxalate is a coprecipitated impurity in frozen beer precipitate. The approximate carbohydrate concentration was determined by the anthrone procedure according to the method used by Haas, G. J., and Fleischman A. I., Wallerstein Lab. Comm., 21, No. 73, 193 (1958)

Qualitative elementary analysis of the carbohydrate fraction of frozen beer precipitate produced from anion free beer showed the presence of nitrogen by sodium metal fusion, and the absence of halogen and sulfur. The absence of sulfur further confirmed the absence of protein since wort and beer proteins would have some portion of sulfur-containing amino acid residues as cystine, cysteine, and methionine. Acid hydrolysis followed by reaction with acidified sodium molybdate and subsequent reduction by acidified ferrous sulfate showed the presence of phosphate.

By quantitative elementary analysis the presence of approximately 1% of phosphate ion and 2.66% of amino nitrogen was found.

Frozen beer precipitate failed to dissolved in cold dilute hydrochloric acid or sulfuric acid and in cold sodium hydroxide solution but did dissolve in concentrated sulfuric acid. The material gave a positive Molisc test and a positive anthrone test for carbohydrates but failed to give Bial's orcinol test for pentoses or the phloroglucinol test for pentoses or galactose. The material failed to reduce copper before hydrolysis but did reduce after hydrolysis indicating it to be a non-reducing poly meric substance. After hydrolysis, Seliwanoff's test fc ketoses was negative. Reaction of partially hydrolyze material with phenylhydrazine and sodium acetate yielde an osazone of indeterminate nature.

A 2.5 hour hydrolysis with 4 N hydrochloric acid in nitrogen atmosphere in which the effluent gases wei trapped in barium hydroxide solution showed that carbo dioxide was given off by the formation of barium ca bonate. A furfural derivative was found in the reactic flask by the phloroglucinol reaction. This is indicati\ of the presence of a uronic acid. The presence of uron acid was confirmed by reacting some partially hydrolyze material with sulfuric acid-acidified alcoholic carbazo solution to give a characteristic purple color.

The uronic acid was tentatively identified as D-glucu onic acid by chromatographing partially hydrolyzed m terial on Whatman No. 1 filter paper, descending, in phenol-water system and spraying with p-anisidine phosphate. Glucose was also found on the chromatogram. D-glucuronic acid was confirmed by reacting the partially hydrolyzed material with mannose and thioglycolic acid in the presence of sulfuric acid to form a red solution, the optical density of which was greater at 410 m$\mu$ than at 480 m$\mu$. Other uronic acids, hexoses, and pentoses have greater optical densities, in this reaction, at 480 m$\mu$ than at 410 m$\mu$. The absence of galacturonic acid, which in most chromatographic systems has a rate of flow (RF) close to glucuronic acid, was shown by a negative cysteine sulfuric acid test.

Glucuronic acid was quantitatively determined by decarboxylating it with 12% hydrochloric acid and determining the carbon dioxide evolved, titrimetrically. The carbohydrate fraction of the frozen beer precipitate consists approximately to 20% of polymerized glucuronic acid.

Chromatography of a partially hydrolyzed sample indicated that glucose was present. This was tentatively confirmed by reacting the partially hydrolyzed material with ferric chloride and phloroglucinol and determining its absorption spectrum. The presence of glucose was confirmed also by the unsulfonated resorcinol reaction according to the method described by Devor, A. W., Unger, I. and Gill, I. Arch of Biochem. and Biophys., 72, 20 1958). Employing the presulfonated resorcinol reaction, the frozen beer precipitate was found to consist approximately to 50% of polymerized glucose.

Chromatography of the partially hydrolyzed material and spraying with ninhydrin indicated the presence of glucosamine. This was confirmed by the Elson-Morgan reaction in which glucosamine is reacted with acetyl acetone to give, under alkaline conditions, 3-acetyl-2-methyl-tetrahydroxy butyl pyrrole. This in turn reacted with dimethylamino benzaldehyde to give a product absorbing at 540 m$\mu$. Although the reaction is quantitative for glucosamine, partial destruction occurs during hydrolysis of the polymer. Therefore, this test was used only qualitatively. Glucosamine was quantitatively determined by the method of Gardell, S., in "Methods of Biochemical Analysis," vol. 6, p. 302 (1958), Interscience, N.Y., in which hexosamines are quantitatively deaminated under alkaline conditions in a phosphate-borate mixture and the amino nitrogen determined by nesslerization. This method will not determine amino acid, protein, or amide nitrogen. The precipitate had approximately 27% of polymerized glucosamine.

Since glucosamine is often found acetylated, a quantitative acetyl determination was run. It was found that the polymer carbohydrate contained 5% of acetyl groups.

From these results it is concluded that the carbohydrate polymer consists of glucose, n-acetylglucosamine, and D-glucuronic acid in the ratio of 5:3:2.

In a beer treated for removal of oxalate ions the percentage of calcium oxalate in the insoluble flakes is lower than 25%, and may actually be too small to permit reliable quantitative estimation.

The origin of the polymeric substance has not been determined with certainty. It is found in unfermented wort consisting solely of malt and water, and treatment of such wort by the method which will presently be disclosed is sufficient to prevent formation of an objectionable precipitate in a packaged beer produced from the wort and subjected to many cycles of alternate freezing and thawing.

In principle the method according to the present invention consists in the addition of an enzyme preparation containing $\beta$-D-glucosaminidase to the wort, to the finished beer prior to packaging, or at any intermediate stage of the brewing process. Such addition has proved to be highly effective in degrading the carbohydrate polymer which is responsible for formation of a solid precipitate upon freezing and thawing of the packaged malt beverage. The optimum temperature and duration of treatment is dependent upon the amount of enzyme used.

The $\beta$-D-glucosaminidase used for carrying out the method of the present invention may be of any origin, and may be employed either in a purified form or as a crude extract as far as the impurities of the extract are compatible with the quality of the treated malt beverage. $\beta$-D-glucosaminidase was found effective for the purposes of the present invention in the presence of oxalic acid decarboxylase previously proposed as a means for destroying oxalic acid, and may be jointly employed therewith for simultaneously achieving the beneficial results of oxalate removal.

While $\beta$-D-glucosaminidase in a purified form is effective, it is rather uneconomical under present conditions. The method of the present invention is preferably performed with a mixture of carbohydrases effective to hydrolyze polymers containing glucosamine and produced by extracting certain edible molluscs, especially the snails of the Gastropod class of molluscs, such as *Helix pomatia* (the French snail) and sea snails, such as *Littorina littorea* (the large periwinkle), *Patella vulgata* (the limpet), *Otala lactea*, *Helix* (*helicogena*) *aperta*, and others.

Preparations containing $\beta$-D-glucosaminidase may also be prepared from other sources, for instance, from fungi, such as *Aspergillus oryzae* and others.

$\beta$-D-glucosaminidase is effective in destroying the precipitate-forming carbohydrate polymer at all temperatures between the freezing temperature of the beer and a maximum temperature somewhat dependent on the origin of the enzyme.

The enzyme is active at a pH normally encountered in brewing operations, i.e. at a pH between about 4.0 and about 5.5.

The enzyme activity is substantially a linear function of enzyme concentration within the concentration range which is practical for the purpose of the present invention. Even small amounts of $\beta$-D-glucosaminidase have a noticeable effect in reducing the amount of sediment formed in beer upon freezing and thawing. There is, of course, an upper useful limit determined by the maximum quantity of the polymer carbohydrate that may be encountered in beer under normal conditions of commercial practise. This limit was found to be at a concentration of about 120 $\beta$-D-glucosaminidase units as determined according to A. Linker, K. Meyer and B. Weissmann, "J. Biol. Chem.," vol. 213 No. 1 (1955) per 1000 cc. of beer or process liquid when using an enzyme preparation as obtained according to Example 1 given hereinafter. Such a concentration of enzyme is more than adequate under usual commercial conditions, and no useful purpose is served by exceeding it.

The following examples may serve to illustrate the present invention without, however, limiting the same to the specific embodiments chosen for the purpose of the disclosure.

EXAMPLE 1

Fifty edible sea snails of the species commonly known as brown-shelled edible snails (*Otala lactea*) were distended by submerging them in water. They were then mechanically deshelled and their fleshy portions were ground with ice water for 2½ minutes in a laboratory mill of the "Omnimixer" type whereby the snails were macerated and extracted. The ground mixture was centrifuged. The supernatant liquid extract was decanted and amounted to 190 cc. The solids were discarded.

Solid ammonium sulfate was dissolved in the extract until the solution had a concentration of the added salt corresponding to 40% saturation while the temperature was held at 34° F. A precipitate formed and was removed by centrifuging. Ammonium hydroxyde was added to the liquid to adjust the pH to 6.5 and additional ammonium sulfate was dissolved therein to raise its concentration to 50% saturation. The precipitate formed was recovered from the liquid by centrifuging and was dissolved in an 0.1 molar sodium acetate buffer solution adjusted to a pH of 4.5. The solution was dialyzed against an 0.1 molar phosphate buffer solution having a pH of 7.0 for 20 hours.

The non-dialyzable fraction contained 1.3 mg. per cc. of protein and had a β-D-glucosaminidase activity of 15.4 units per cc. This solution will be referred to hereinafter as snail enzyme solution. This solution may be converted into the dry state by lyophilizing.

An analysis of lyophilized snail enzyme gave the following results.

A. Chemical Analysis

| Component: | Percent |
|---|---|
| Moisture | 6.45 |
| Lipids | 20.00 |
| Total protein | 10.05 |
| Hexoses, polymerized | 2.15 |
| Ash | 61.60 |
| Uronic acids | 1.04 |
| Hexosamines | 0.51 |

B. Enzymatic Analysis

| Enzyme | Units/g. | Reference |
|---|---|---|
| β-Glucuronidase | 22,800 | 1 |
| Amylase | 0 | 2 |
| Cellulase | 1,550 | 3 |
| β-Glucosaminidase | 6,000 | 4 |

References describing the units:
1. Fishman Unit. "Advances in Enzymology," vol. 16, pp. 361–409 (1955).
2. Methods in Enzymology, vol. 1, p. 149, Article by P. Bernfeld, Edited by S. P. Colowick and N. O. Kaplan (1955), Academic Press, N.Y.
3. Myers, S.F.L., & Northcote, D.H.; Biochem. J., vol. 71, p. 749 (1959). 1 unit=that quantity of enzyme giving 1 microgram glucose at 25° C. in 12 hours from insoluble phosphoric acid swollen cotten lintners at pH 5.6.
4. Linker, A., Meyer, K., and Weissmann, B., J. Biol. Chem., vol. 213, No. 1 (1955). 1 unit is defined as that quantity of enzyme which liberates 1 microgram of phenol in 1 hour at 37° C. at pH 4.6 from N-acetyl-β-phenyl-D-glucosaminide which was synthesized according to the method of Helferich, B., and Iloff, A., J. Physiol. Chem., vol. 221, p. 252 (1933).

EXAMPLE 2

A commercially produced Lager beer packed in conventional 12 oz. cylindrical metal cans was subjected to alternate storage in air at −18° C. and at +24° C. for 24 hours each. The beer as received had the following properties characteristic of good commercial practice:

| | Average |
|---|---|
| Color, ½" cell, Lov. Ser. 52 | 2.6 |
| Apparent extract, percent | 2.99 |
| Real extract, percent | 4.73 |
| Alcohol by weight, percent | 3.78 |
| Original extract, percent | 12.02 |
| Degree of attenuation, percent | 60.8 |
| Reducing sugars, percent | 1.21 |
| Protein, percent | 0.31 |
| Acidity (as lactic), percent | 0.14 |
| pH | 4.25 |
| Carbon dioxide, volumes | 2.67 |
| Air content, ml./12 oz | 1.1 |

The storage periods were 24 hours to cause complete freezing of the can contents during −18° C. storage, and also 24 hours to cause complete thawing at +24° C. Sample cans were drawn before the first cycle and after the first, third, fifth, and tenth cycle of alternate freezing and thawing. The contents of the sample cans were removed and filtered. The weight of material retained by the filter was determined to be as follows:

| | |
|---|---|
| Before the first cycle | Brilliant |
| After the first cycle | g-- 0.010 |
| After the third cycle | g-- 0.014 |
| After the fifth cycle | g-- 0.026 |
| After the sixth cycle | g-- 0.028 |
| Afer the seventh cycle | g-- 0.034 |
| After the ninth cycle | g-- 0.049 |
| After the tenth cycle | g-- 0.056 |

EXAMPLE 3

5 mg. of the precipitate recovered by filtration in Example 2 were dispersed in 2 cc. of snail enzyme solution obtained according to Example 1, the pH of which was 4.5, and in which the precipitate was insoluble. The resulting mixture was inculcated at 99° F. for 18 hours. The solid material dissolved. The presence of d-glucose, of N-acetyl glucosamine, and of d-glucuronic acid in the solution was confirmed by chemical tests and by chromatographic analysis, as described above.

EXAMPLE 4

12 oz. portions of beer from the same batch from which the cans of Example 2 were taken were mixed with snail enzyme solution and permitted to stand at 8° C. for 5 days. The mixtures were packed in metal cans identical with those used in Example 2, and were subjected to ten cycles of the afore-described freezing and thawing treatment. The cans were then opened and examined. The results are tabulated below.

TABLE

| Enzyme concentration (units/liter): | Result |
|---|---|
| 0 | Heavy flakes (+). |
| 6 | Clear (neg.). |
| 11 | Do. |
| 36 | Do. |
| 60 | Do. |
| 95 | Do. |
| 119 | Do. |

That the husk is not the prime source of the polymer causing frozen beer precipitate, was proved by the following test.

Beer was brewed from dehusked malt by standard American practice on a pilot plant level. The beers were canned, pasteurized, and frozen and thawed. When examined, flakes of frozen beer precipitate were found.

By the above mentioned treatment with the enzyme solution formation of the precipitate was completely prevented.

EXAMPLE 5

12 oz. portions of beer from a similar batch from which the cans in Example 2 were taken were mixed with snail enzyme solution and oxalic decarboxylase. They were permitted to stand at 8° C. for 5 days, then commercially canned, and pasteurized. The cans were subjected to the aforementioned freezing and thawing treatment and then examined. The results are tabulated below.

TABLE

| Enzyme concentration (units/liter) | Oxalic decarboxylase concentration (units/liter) | Precipitate formation | Percent of oxalate destroyed |
|---|---|---|---|
| 0 | 0 | + | 0 |
| 6 | 321 | neg. | 100 |
| 11 | 321 | neg. | 100 |
| 36 | 321 | neg. | 100 |
| 60 | 321 | neg. | 100 |
| 95 | 321 | neg. | 100 |
| 119 | 321 | neg. | 100 |
| 600 | 321 | neg. | 100 |

Oxalic acid was determined manometrically.

EXAMPLE 6

Wort was prepared by the usual commercial procedure. Just prior to the addition of yeast and fermentation by standard American commercial methods, graded amounts of snail enzyme solution were added. The resultant beer was treated as described in Example 4 and subjected to the same tests.

TABLE

| Units of enzyme added per liter: | Frozen beer precipitate |
|---|---|
| 0 | + |
| 0.8 | Neg. |
| 2 | Neg. |
| 4 | Neg. |
| 8 | Neg. |
| 24 | Neg. |
| 40 | Neg. |
| 78 | Neg. |

A very slight haze was seen in the treated material when examined under strong lights, while heavy flakes were seen in the control. Chemical analysis indicated that the haze consisted primarily of calcium oxalate and proteinaceous material. Carbohydrate (Molisch test) and uronic acid (carbazole test) were absent. The haze immediately dissolved in normal hydrochloric acid (unlike frozen beer precipitate) and upon hydrolysis gave only amino acid tests (for instance, Hopkins-Cole glyoxalate test etc.). The oxalate was therein a major constituent and was decomposed to carbon dioxide by a treatment with oxalic decarboxylase in a Warburg respirometer.

EXAMPLE 7

An enzyme preparation obtained from a crude extract of *Aspergillus oryzae* as sold under the trademark "Mylase-P" containing 24,200 units of glucosaminidase per gram was added to beer in an amount of 100 mg. of "Mylase-P" per liter. The mixture was allowed to stand at 35° C. for 24 hours. The samples were frozen and thawed in polyethylene containers and examined for the formation of frozen beer precipitate. The control sample showed precipitate while the treated sample was devoid of it.

Enzymatic analysis of "Mylase-P" showed high concentrations of the enzyme β-D-glucosaminidase and was devoid of β-glucuronidase or cellulase.

EXAMPLE 8

A mixture of the enzyme preparation from snail extract containing 5 units of β-glucosaminidase and 321 units of oxalic decarboxylase was added to 1000 cc. of wort at the start of a normal fermentation. As a result of this addition both the formation of frozen beer precipitate and the formation of calcium oxalate haze in the beer were materially prevented.

EXAMPLE 9

Several batches of wort were prepared by the usual commercial procedure. Just prior to the addition of yeast and fermentation by standard American commercial methods, graded amounts of snail enzyme solution were added. The resultant beer was treated as described in Example 4 and subjected to the same tests.

TABLE

| Units enzyme added: | Precipitate formation |
|---|---|
| 0 | + |
| 0.8 | Neg. |
| 2.4 | Neg. |
| 4.0 | Neg. |
| 8.1 | Neg. |
| 24 | Neg. |
| 80 | Neg. |
| 160 | Neg. |

No flakes were seen except in the untreated control.

EXAMPLE 10

To ale, prepared by standard American commercial practice, graded amounts of snail enzyme (β-glucosaminidase) plus 224 units of oxalic decarboxylase per liter were added. The samples were stored at 8° C. for 3 days, canned, commercially pasteurized, and frozen and thawed. The results are shown below.

TABLE

| Units of Snail Enzyme Added per Liter | Frozen Beer Precipitate Formed | Residual Oxalic Acid (Parts per Million) |
|---|---|---|
| 0 | + | 17.4 |
| 8.7 | Haze ± | 0 |
| 17.6 | Neg. | 0 |
| 34.8 | Neg. | 0 |
| 44.0 | Neg. | 0 |

EXAMPLE 11

Several brands of American beers bought in the New York area were treated with 26 units of snail enzyme β-glucosaminidase per 700 cc. of beer and 244.7 units of oxalic decarboxylase. The beers were stored for 3 days at 8° C., canned, and pasteurized by commercial methods. The cans were subjected to alternate freezing and thawing and examined for the formation of frozen beer precipitate. The beer formed the precipitate without treatment but did not form the precipitate when treated.

EXAMPLE 12

To 700 cc. of an imported all malt beer there were added 11 units of snail enzyme (β-glucosaminidase). The sample was stored at 8° C. for 3 days, canned, pasteurized, and frozen and thawed.

The untreated control showed heavy flakes. The treated sample was slightly hazy but devoid of flakes of frozen beer precipitate.

The process according to the present invention can also be employed in the known process of producing concentrated malt beverages such as beer by freezing. Addition of β-D-glucosaminidase before such freeze-concentration considerably reduces the formation of precipitates in the concentrated beverages.

Of course, many changes and variations in the preparation of the β-glucosaminidase employed, the amounts of enzyme added, the reaction conditions, temperature, and duration, and the like may be made by those skilled in the art in accordance with the principles set forth herein and in the claims annexed hereto.

We claim:

1. In a process of preventing formation of precipitates in fermented malt beverages, the step which comprises adding at least at one stage of the brewing process, prior to the consumer packaging of the beverage, an enzyme preparation containing β-D-glucosaminidase to the brewing liquids in an amount corresponding to at least 0.8 unit of β-D-glucosaminidase per liter of beverage, so as to prevent formation of precipitates on freezing and thawing of the beverage.

2. The process according to claim 1, wherein the brewing liquid to be treated is a substantially end-fermented malt beverage.

3. The process according to claim 1, wherein the brewing liquid to be treated is the wort.

4. The process according to claim 1, wherein the brewing liquid to be treated is the fermented malt beverage.

5. The process according to claim 1, wherein the enzyme preparation added to the brewing liquid is an enzyme preparation obtained from sea snails.

6. The process according to claim 1, wherein an oxalic acid-destroying enzyme is additionally added to the brewing liquid.

7. The process according to claim 1, wherein the enzyme preparation added to the brewing liquid is an enzyme preparation obtained from fungi.

8. The process according to claim 1, wherein the enzyme preparation added to the brewing liquid is an enzyme preparation obtained from *Aspergillus oryzae*.

9. In a process of preventing formation of precipitates in fermented malt beverages, the step which comprises adding at least at one stage of the brewing process, prior to the consumer packaging of the beverage, β-D-glucosaminidase to the brewing liquids in an amount corresponding to at least 0.8 unit of β-D-glucosaminidase per liter of beverage, so as to prevent formation of precipitates on freezing and thawing of the beverage.

10. In a process of preventing formation of precipitates in fermented malt beverages, the step which comprises adding at least at one stage of the brewing process, prior to the consumer packaging of the beverage, β-D- glucosaminidase and an oxalic acid-destroying enzyme to the brewing liquids in an amount corresponding to at least 0.8 unit of β-D-glucosaminidase per liter of beverage, so as to prevent formation of precipitates on freezing and thawing of the beverage.

References Cited in the file of this patent
UNITED STATES PATENTS
2,878,125  Brenner _____ Mar. 17, 1959